(12) United States Patent
Blanchard et al.

(10) Patent No.: US 8,757,966 B2
(45) Date of Patent: Jun. 24, 2014

(54) STATIONARY VANE ASSEMBLY FOR A TURBINE ENGINE HAVING A REDUCED WEIGHT, AND TURBINE ENGINE COMPRISING AT LEAST ONE SUCH STATIONARY VANE ASSEMBLY

(75) Inventors: Stéphane Pierre Guillaume Blanchard, Chartrettes (FR); Fabrice Marcel Noël Garin, Boissise la Bertrand (FR); Laurent Pierre Joseph Ricou, Melun (FR); Mathieu Dakowski, Noiseau (FR)

(73) Assignee: SNECMA, Paris (FR)

( * ) Notice: Subject to any disclaimer, the term of this patent is extended or adjusted under 35 U.S.C. 154(b) by 744 days.

(21) Appl. No.: 13/059,790

(22) PCT Filed: Aug. 25, 2009

(86) PCT No.: PCT/EP2009/060932
§ 371 (c)(1),
(2), (4) Date: Jun. 14, 2011

(87) PCT Pub. No.: WO2010/023205
PCT Pub. Date: Mar. 4, 2010

(65) Prior Publication Data
US 2011/0250061 A1  Oct. 13, 2011

(30) Foreign Application Priority Data
Aug. 26, 2008  (FR) ...................................... 08 55731

(51) Int. Cl.
*F01D 9/02* (2006.01)
*F01D 9/04* (2006.01)

(52) U.S. Cl.
CPC .. *F01D 9/023* (2013.01); *F01D 9/04* (2013.01)
USPC .......................................... 415/190; 415/209.3

(58) Field of Classification Search
USPC ...................... 415/209.3, 190, 191
See application file for complete search history.

(56) References Cited

U.S. PATENT DOCUMENTS

| 3,824,034 A | 7/1974 | Leicht |
| 4,725,199 A | 2/1988 | Johnson |

(Continued)

FOREIGN PATENT DOCUMENTS

| EP | 0 363 280 A1 | 4/1990 |
| EP | 0 513 956 A1 | 11/1992 |

(Continued)

OTHER PUBLICATIONS

Office Action issued Jun. 11, 2013, in Russian Patent Application No. 2011111394/06 (with English-language translation).

(Continued)

*Primary Examiner* — Edward Look
*Assistant Examiner* — Jason Davis
(74) *Attorney, Agent, or Firm* — Oblon, Spivak, McClelland, Maier & Neustadt, L.L.P.

(57) ABSTRACT

A stationary vane assembly of a turbine engine including an inner casing and a high-pressure turbine guide vane assembly including at least two angular sectors including blades, the angular sectors being fixed on the casing, each angular sector including a platform and a fastening tab. The fastening tab protrudes from the platform radially inwardly. The casing includes a first annular groove receiving the fastening tabs, radial retaining pins for the angular sectors being introduced into bores made in the casing and the fastening tabs, the axial retaining pins being axially stopped by a ring mounted in a second annular groove of the casing.

12 Claims, 6 Drawing Sheets

(56) References Cited

U.S. PATENT DOCUMENTS

| | | | |
|---|---|---|---|
| 5,007,800 A | 4/1991 | Hacault et al. | |
| 5,211,536 A | 5/1993 | Ackerman et al. | |
| 5,224,822 A | 7/1993 | Lenahan et al. | |
| 5,459,995 A | 10/1995 | Norton et al. | |
| 6,742,987 B2 * | 6/2004 | Correia et al. | 415/189 |
| 7,264,442 B2 * | 9/2007 | Harding | 415/173.7 |
| 2004/0219014 A1 | 11/2004 | Synnott | |

FOREIGN PATENT DOCUMENTS

| | | |
|---|---|---|
| FR | 2 136 773 | 12/1972 |
| FR | 2 846 997 A1 | 5/2004 |
| FR | 2 907 499 A1 | 4/2008 |
| GB | 745073 | 2/1956 |
| GB | 2 424 248 A | 9/2006 |

OTHER PUBLICATIONS

U.S. Appl. No. 13/059,242, filed Feb. 16, 2011, Blanchard, et al.
International Search Report issued Nov. 17, 2009, in PCT/EP2009/060932.
French Preliminary Search Report issued Apr. 14, 2009, in French Patent Application No. 0855731 with English translation of category of cited documents.
U.S. Appl. No. 13/141,857, filed Jun. 23, 2011, Blanchard, et al.

* cited by examiner

STATIONARY VANE ASSEMBLY FOR A TURBINE ENGINE HAVING A REDUCED WEIGHT, AND TURBINE ENGINE COMPRISING AT LEAST ONE SUCH STATIONARY VANE ASSEMBLY

TECHNICAL FIELD AND BACKGROUND

The present invention relates to a stationary vane assembly for a turbine engine, for example a high-pressure or low-pressure turbine guide vane assembly, in particular for an airplane turbojet engine, and to a turbine engine comprising at least one such stationary vane assembly.

An airplane turbojet engine traditionally comprises a high-pressure compressor, a low-pressure compressor, a combustion chamber, a high-pressure turbine engine and a low-pressure turbine engine.

The compressor is intended to increase the pressure of the atmospheric air, the combustion chamber mixes the air that is compressed by the compressor with fuel and burns that mixture, and the turbine, placed in the ejected flow, is driven by that high-temperature gas flow. The turbine serves in particular to drive the compressors.

The compressors comprise rotor vanes and stationary guide vanes guide the flow between the compression stages.

At the output of the combustion chamber, a fixed high-pressure guide vane assembly is provided, intended to rectify the hot gas flow leaving the combustion chamber before it comes into contact with the high-pressure turbine. This high-pressure guide vane assembly comprises a ring fixed on a casing, called inner casing, and blades extending radially outwardly. The inner casing ensures the connection between the compressor and the turbine.

The guide vane assembly is made up of several sectors, each fixed on the inner casing.

Each sector comprises, traditionally, a platform from which blades extend radially outwardly and a fastening tab for fastening to the casing extends radially inwardly. The tab comprises two bores intended to be aligned with two bores of the inner casing provided on the side of the high pressure turbine, pins is inserted into these aligned bores, a flange is added downstream of the pins to retain them axially.

This type of turbojet engine is for example known from document FR 2 907 499.

This type of fastening is satisfactory, but the mass of the assembly is substantial, the axial immobilization of the pins being obtained by the additional annular flange.

It is consequently one aim of the present invention to propose a stationary vane assembly for a turbine engine whereof the mass is reduced.

BRIEF DESCRIPTION OF THE INVENTION

The previously stated aim is achieved by a stationary vane assembly of a turbine engine comprising at least two angular sectors provided with blades and a platform, the blades extending radially outwards from the platform and a casing on which the angular sectors are fixed, the radial retention of the angular sectors being obtained using pins passing through a tab protruding from the platform radially inwards, and a ring mounted in a groove of the casing and forming an axial stop for said pins so as to keep them in a radial retention position of the angular sectors.

In other words, the flange of the prior art is replaced by a simple elastic ring whereof the mass is low relative to that of the flange. Moreover, its placement and maintenance in position are very simple. The ring is also easy to remove in case of maintenance on an angular sector.

In the particular case of a guide vane assembly-inner casing assembly, the pins for fastening the guide vane assembly on the inner casing are mounted on the combustion chamber side, as well as an axial retaining ring of said pins. The available space unused to date on the side of the combustion chamber is then used, to perform the assembly, which makes it possible to position the high-pressure turbine as close as possible to the guide vane assembly.

The present invention then primarily concerns a stationary vane assembly of a turbine engine with a longitudinal axis comprising a casing and at least two angular sectors provided with blades, said angular sectors being fixed on the casing, each angular sector comprising a platform from which at least one blade protrudes radially outwards and a fastening tab for fastening the angular sector on the casing, said fastening tab protruding from the platform radially inwards, the casing comprising a first annular groove with a longitudinal axis receiving the fastening tabs, the stationary vane assembly comprising radial retaining pins for retaining the angular sectors introduced into the bores made in the casing and the fastening tabs, said bores having axes parallel to the longitudinal axis, the casing also comprising a second annular groove with longitudinal axis receiving an axial retaining ring of the radial retaining pins.

Each pin can comprise a first radial skirt axially delimiting a head and a tail, the tail passing through the bores of the casing and the fastening tab, said first skirt bearing by one face against an annular rib separating the first and second grooves, and by another face against the ring, the ring bearing by a radially outer edge against a portion of the periphery of the head of each pin oriented radially inwards.

Advantageously, the pins comprise a second radial skirt at one free end of the head, said second skirt defining, with the first skirt, a space with a width substantially equal to that of the second annular groove, and receiving a portion of the radially outer edge of the ring.

The first and second skirts of the pins can each comprise a flat section, and means for angular immobilization of the pins. The angular immobilization means are, for example, formed by a housing provided with a flat section with a shape corresponding to that of the first skirt bordering the bore of the annular separating rib such that the flat sections of the skirts are oriented radially outwards.

The ring can be slotted, and advantageously comprises two ends overlapping such that the ring forms a closed loop.

For example, the ends of the ring are thinner and are connected by a portion with a larger thickness, the ends overlapping, each of the ends being provided with at least one piercing for the insertion of a tool to bring the ends closer together or further apart.

In one alternative embodiment, the face of the first groove opposite the separating rib comprises non-through bores each receiving the free end of the tail of a pin.

In another alternative embodiment, the face of the first groove opposite the separating rib comprises through bores each receiving the free end of the tail of a pin.

In another alternative embodiment, the free ends of the tails of the pins bear against the face of the first groove opposite the separating rib.

The fastening tabs of the angular sectors can each comprise two bores arranged on an arc of circle centered on the longitudinal axis, one having a circular section and the other having an oblong section whereof the larger dimension is substantially aligned with the arc of circle.

The casing is for example a inner casing and the angular sectors form a high-pressure turbine guide vane assembly, the ring being arranged on the combustion chamber side relative to the first groove.

The present invention also relates to a turbine engine comprising at least one stationary vane assembly according to the present invention.

BRIEF DESCRIPTION OF THE DRAWINGS

The present invention will be better understood using the following description and drawings, in which.

DETAILED DESCRIPTION OF THE INVENTION

The following description will provide a detailed description of a guide vane assembly for a high-pressure turbine; however, the invention is not limited to a guide vane assembly, but rather applies to any stationary vane assembly for a turbine engine.

Figure 1A:
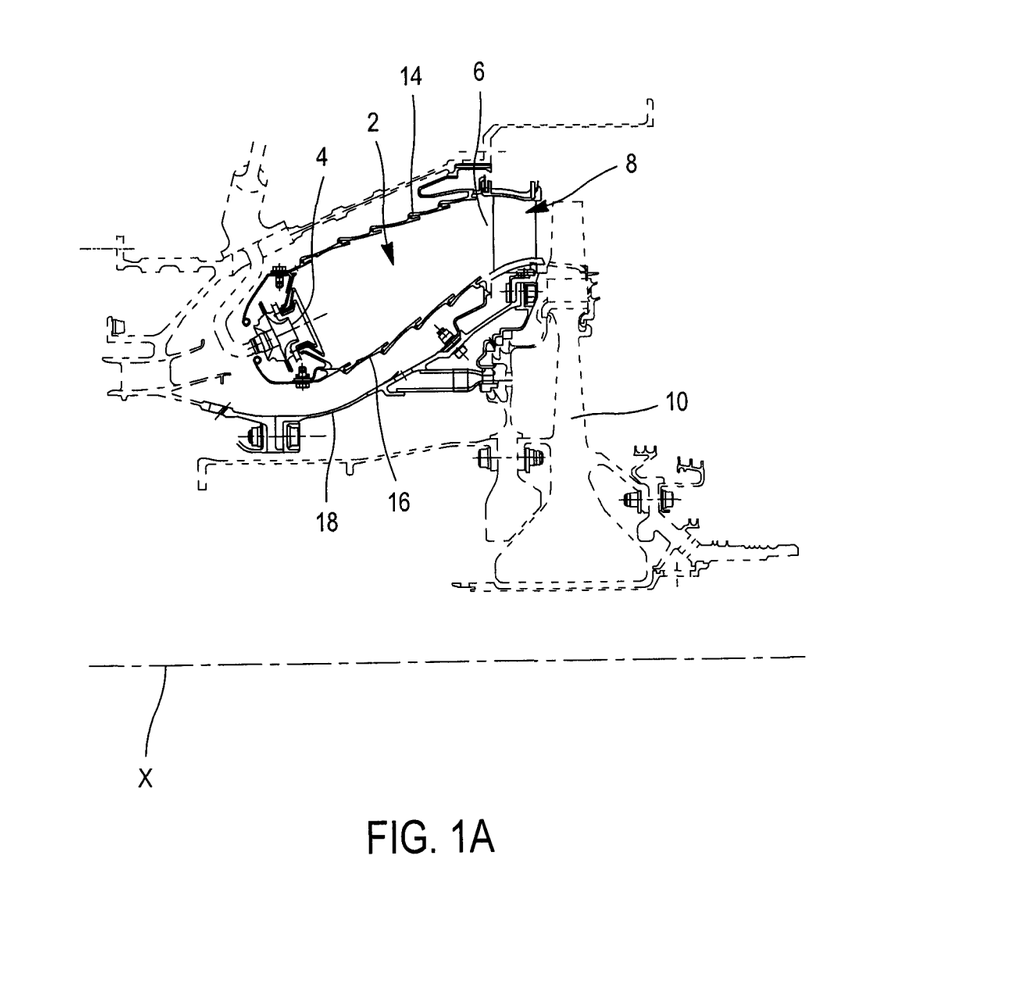
FIG. 1A is a longitudinal cross-sectional view of a portion of a turbojet engine according to the present invention at the combustion chamber and the high-pressure turbine.

We will consider, for the description, the direction from left to right in FIG. 1, which corresponds to the flow direction of the gas flow, the left being designated by upstream and right being designated by downstream.

For simplification purposes, we will use the same references to designate elements having the same function and substantially the same structure in the various embodiments described.

FIG. 1A shows a detailed view of a turbojet engine according to the present invention with axis of revolution X. This turbojet engine in particular comprises a combustion chamber 2, provided upstream with an intake orifice 4 for air coming from the compressor (not shown), and an exhaust orifice 6 for combustion gases. The turbojet engine also comprises a high-pressure guide vane assembly 8 arranged downstream of the exhaust orifice 6, a high-pressure turbine 10 downstream of the guide vane assembly 8, the turbine 10 driving the compressor.

The combustion chamber 2 is made up of a radially outer enclosure 14 fixed on an outer casing and a radially inner enclosure 16 fixed on an inner casing 18, designated "inner casing."

The guide vane assembly 8 is fixed on the inner casing 18. As shown in detail in FIG. 2, the guide vane assembly 8 comprises blades 12 extending between a radially outer ring 9 and a radially inner ring 11. The blades 12 are arranged downstream of the exhaust orifice 6 on the flow path of the combustion gases, these blades 12 are intended to rectify the gas flow leaving the combustion chamber 2 before its interaction with the high-pressure turbine 10.

Figure 2:
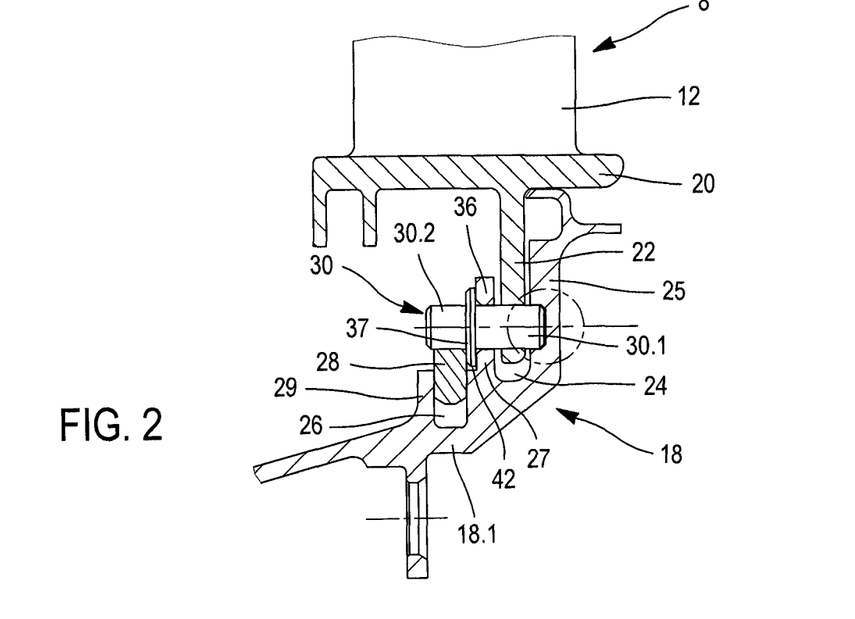
FIG. 2 is an enlarged view of FIG. 1 at the fastening of the high-pressure guide vane assembly on the inner casing.

The guide vane assembly 8 is made up of at least two angular sectors 8.1 fixed separately on the inner casing 18. As an example, the guide vane assembly 8 comprises 16 angular sectors 8.1 each provided with two blades.

The blades 12 extend radially outwards from a platform 20, forming a portion of the inner ring 11 of the guide vane assembly 8. A fastening tab 22 for fastening the platform 20 on the inner casing 18 protrudes radially towards the inside of the platform 20 on the opposite face of the platform 20 supporting the blades 12.

When all of the angular sectors 8.1 are fixed on the inner casing, the platforms placed end to end form a continuous ring.

FIG. 2 shows the inner casing 18 comprising, at its downstream end 18.1, a first annular groove 24 with axis X, open radially outwards and a second annular groove 26 with axis X, open radially outwards. The first groove 24 is positioned between the second groove 26 and the high-pressure turbine 10. The first groove 24 is delimited by a first annular rib 25 and a second annular rib 27; the second annular groove 26 is delimited by the second annular rib 27 and a third annular rib 29, the second annular rib 27 separating the first 24 and second 26 grooves.

The first groove 24 receives the fastening tab 22 of the angular sectors of the high-pressure guide vane assembly 8.

According to the present invention, pins 30 for radially retaining the angular sectors 8.1 are introduced into the bores of the fastening tabs 22 and the inner casing 18, the pins 30 securing the angular sectors on the inner casing 18. A ring 28 is provided in the second groove 26 forming an axial stop for the radial retention pins 30.

According to one preferred embodiment, the radial retaining pins 30 are mounted in the inner casing 18 and in the fastening tabs 22 on the combustion chamber 2 side, as well as the retaining ring 28. The distance between the guide vane assembly 8 and the turbine 10 can then be reduced as much as possible while respecting play to avoid mechanical interference between the turbine 10 and the guide vane assembly 8.

Figure 1B:
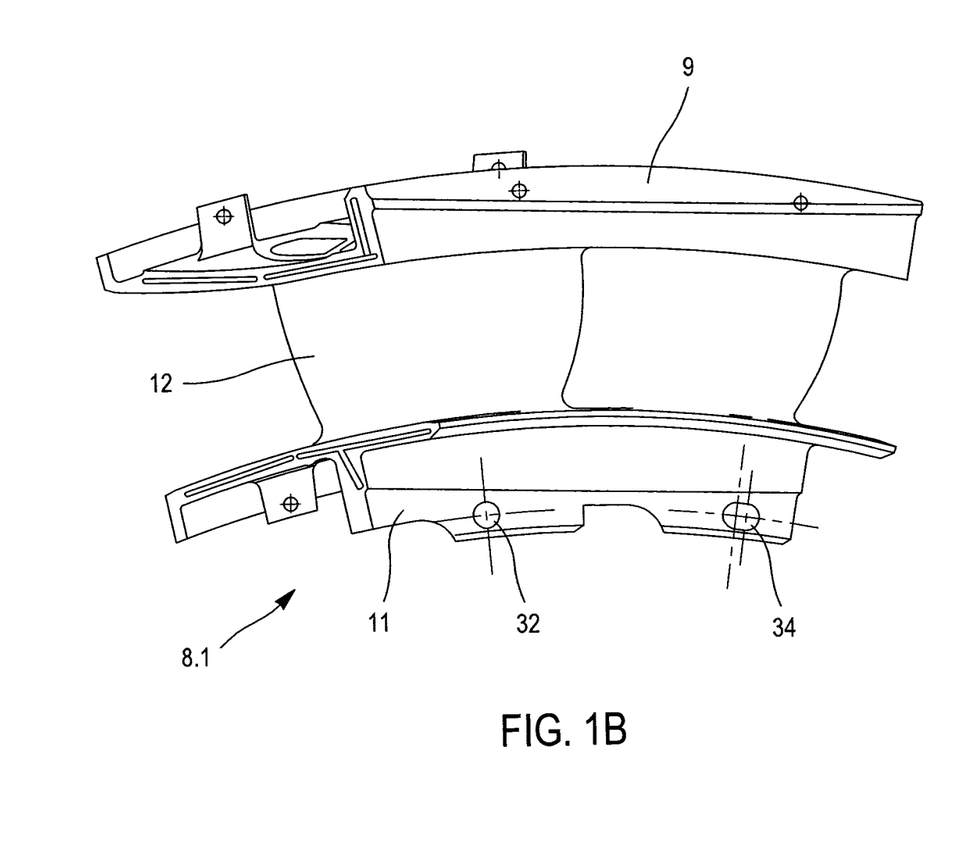
FIG. 1B is a front view of an angular sector of a guide vane assembly of a turbojet engine of FIG. 1A.

As shown in FIG. 1B, each fastening tab 22 comprises two through bores 32, 34 positioned on an arc of circle portion centered on the axis X. One of the bores 32 has a circular section with a diameter substantially equal to that of the radial retaining pins 30 to allow them to be placed in the bore 32, and the other 34 has an oblong section whereof the larger dimension is oriented along the arc of circle centered on the axis X, the smaller diameter being substantially equal to the diameter of the radial retaining pins 30. The implementation of a circular bore and an oblong bore allows assembly even in case of variation in the dimensions.

The second annular rib 27 also comprises pairs of bores 36, as many pairs of bores 36 as angular guide vane assembly sectors to be fixed on the inner casing 18.

The radial position and the relative spacing of each pair of bores 36 are such that the bores 36 are aligned with the bores 32, 34 of an angular sector 8.1, when the latter is in place. In the illustrated example, the platform 20 bears on the radially outer end of the first annular rib 25.

The bores 32, 34, 36 have an axis substantially parallel to the longitudinal axis X.

Advantageously, the upstream end of the bores 36 is beveled to facilitate placement of the pins 30.

Each radial retaining pin 30 passes through a bore 36 of the second annular rib 27 and a bore 32 or 34 of the fastening tab 22.

Each radial retaining pin 30 comprises at least one axial stop formed, in the illustrated example, by a skirt 37 protruding radially and bearing against an upstream face of the second annular rib 27.

This skirt 37 axially delimits, in the radial retaining pin 30, a tail 30.1 passing through the bores 36 and 32 or 34, and a head 30.2 positioned on the combustion chamber 2 side.

Figure 3A:
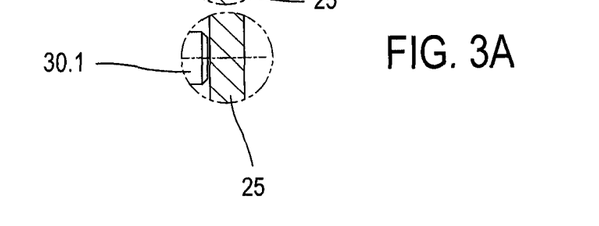
FIGS. 3A to 3C are detailed views of FIG. 2 according to three alternative embodiments.
Figures 3B, 3C:
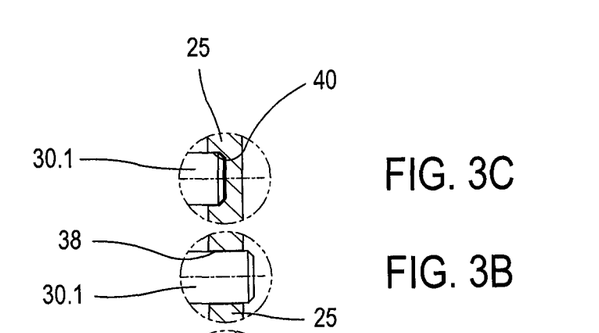

FIGS. 3A to 3C show different shapes for the first rib 25.

In FIG. 3A, the first rib 25 comprises a planar upstream face, the free end of the tail 30.1 of the pin 30 is bearing against that face. This embodiment is very simple and does not damage the sealing between the two zones on either side of the inner casing 18, which are at different pressures.

In FIG. 3B, the first rib 25 comprises a plurality of pairs of through bores 38 receiving the free end of the tail 30.1 of each pin 30, the number of pairs of bores 38 being equal to the number of angular guide vane assembly sectors to be fixed. This embodiment is easy to manufacture and ensures good rigidity of the connection between the angular sector and the inner casing.

FIG. 3C shows another alternative embodiment, in which the first rib 25 comprises a plurality of pairs of non-through bores 40 receiving the free end of the tails 30.1 of the radial retaining pins 30, the number of pairs of bores 40 being equal to the number of angular guide vane assembly sectors to be fixed. The free end of each tail 30.1 therefore abuts against the bottom of a bore 40.

This alternative embodiment makes it possible both not to damage the sealing and to ensure good rigidity of the connection between the angular sector and the inner casing.

In the illustrated example, the upstream face of the second rib 27 comprises a recess 42 for receiving the skirt 37, so that the skirt does not protrude from the upstream face of the second rib 27, preventing bothering the placement of an axial retaining ring 28.

The axial retaining ring 28 is placed in the second groove bearing against the upstream face of the skirts 37, and forms an axial stop for the radial retaining pins 30.

The axial retaining ring 28 has a thickness substantially equal to the width of the second annular groove 27.

Figure 4:
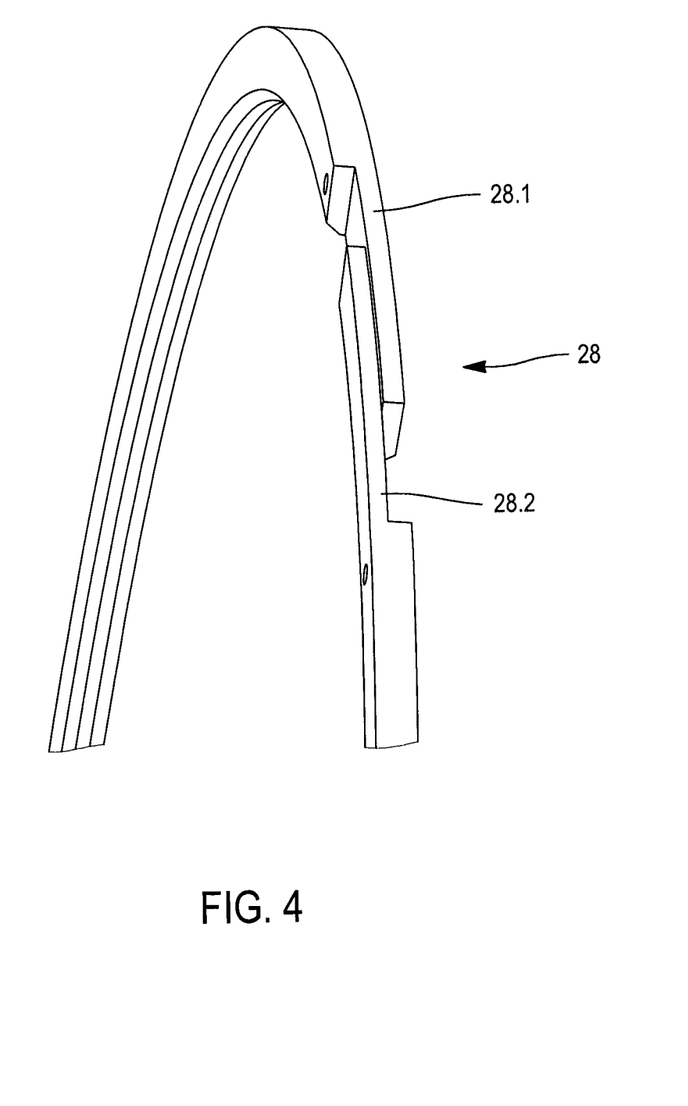
FIG. 4 is a perspective view of a ring forming an axial stop for the radial retaining pins.

The axial retaining ring 28 is of the circlips type, it is slotted and both ends 28.1, 28.2 thereof can be spaced apart or brought closer together to allow the ring 28 to be mounted in the second groove 26, and the assemblies of radial retaining pins 30, respectively. FIG. 4 shows the axial retaining ring at its slotted zone, the ends 28.1, 28.2 are in step form and at least partially overlap in the assembly position, so as to form a continuous circular stop. Moreover, the covering is sufficient to prevent the axial retaining ring 28 from opening during operation, which, if the opening were opposite a radial retaining pin 30, would prevent the ring 28 from performing its function.

Moreover, such an overlap of the ends 28.1, 28.2 allows the axial retaining ring 28 to be contained in its housing without risking it escaping from the second annular groove 26 by loss of elasticity.

The ends 28.1, 28.2 are each provided with a piercing for the insertion of a spacing tool of the ring.

We will now explain the assembly of the high-pressure guide vane assembly 8 on the inner casing 18.

The ends 28.1, 28.2 of the axial retaining ring 28 are spaced apart, so as to allow it to be placed in the second groove 26.

The angular sectors 8.1 are then placed on the inner casing 18, more particularly their tab 22 is inserted in the first groove 24, function play is provided between the downstream and upstream faces of each tab 22 and the upstream face of the first rib 25 and the downstream face of the second rib 27, respectively, so as to accommodate the dimension variations due to the expansion of the inner casing 28 and the guide vane assembly, while reducing the movements of the angular sectors.

The fastening tabs 22 are inserted into the first groove 24 so as to align the bores 32, 34 of the fastening tabs 22 with the bores 36 of the second rib 27.

The radial retaining pins 30 are then inserted along a direction parallel to the longitudinal axis X, for some in the aligned bores 32, 36, and for the others in the aligned bores 34, 36, until their skirt 37 bears against the upstream face of the second rib 27. To that end, the axial retaining ring 28 is tightened and pushed into the bottom of the second groove. When all of the radial retaining pins 30 are in place, the axial retaining ring 28 is released. Due to its elasticity, the ring 28 abuts by its radially outer edge against the heads 30.2 of the pins and forms a radial stop for the skirts 37. The radial bearing of the ring 28 on the heads 30.2 ensures transverse immobilization of the axial retaining ring 28.

The risks of a radial retaining pin 30 leaving its bores 32, 36 or 34, 36 are very low, since it would be necessary on one hand for the ring to lose its elasticity and fall to the bottom of the groove, and on the other hand for the pin 30 to move axially.

Figure 5:
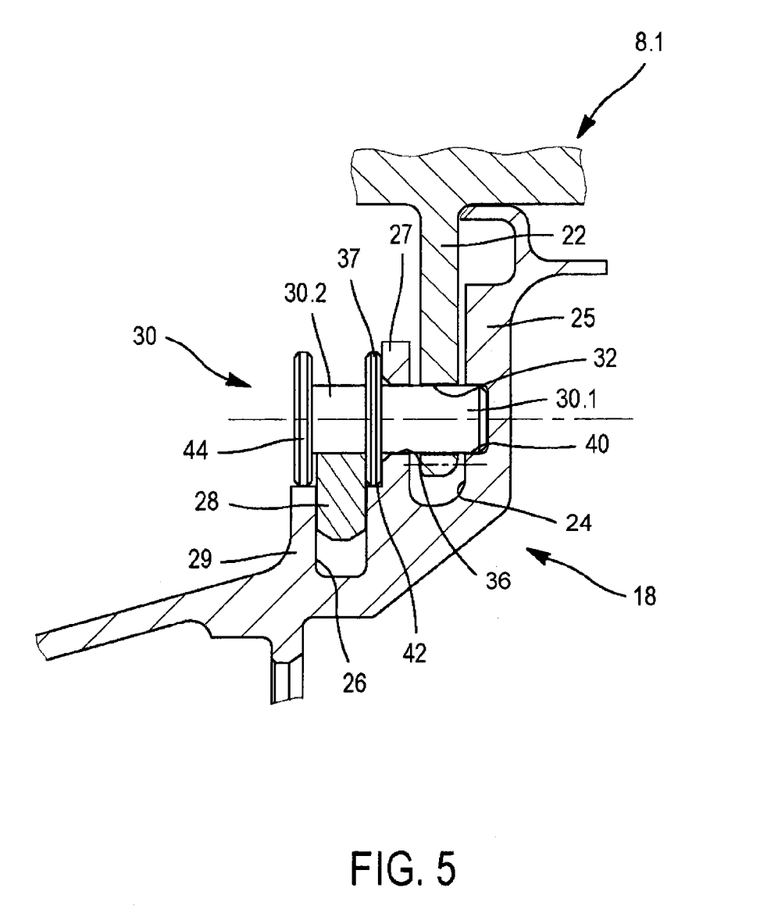
FIG. 5 is an enlarged cross-sectional view of another embodiment of the fastening of an angular sector on a inner casing.

FIG. 5 shows a second embodiment of an assembly of the guide vane assembly on the inner casing according to the present invention.

In this second example, the radial retaining pins 30 comprise a second skirt 44 situated at the free end of the heads 30.2 of the radial retaining pins 30. The second skirt 44 delimits, with the first skirt 37, a groove receiving the axial retaining ring 28.

Thus, the axial retaining ring 28 is received by its radially inner edge in the second groove 26 and by its radially outer edge between the skirts 37, 44. The skirts 37, 44 have the same diameter in the illustrated example. Skirts with different diameters could, however, be provided.

Thus, even in case of very strong vibrations, the axial retaining ring 28 cannot escape.

The assembly of this second embodiment is very similar to that of the first embodiment. In this case, however, the angular position of the axial retaining ring 28 is such that the two piercings of the ends 28.1 of the axial retaining ring 28 are situated between two radial retaining pins 30 to make them accessible to the tightening tool.

Figure 6:
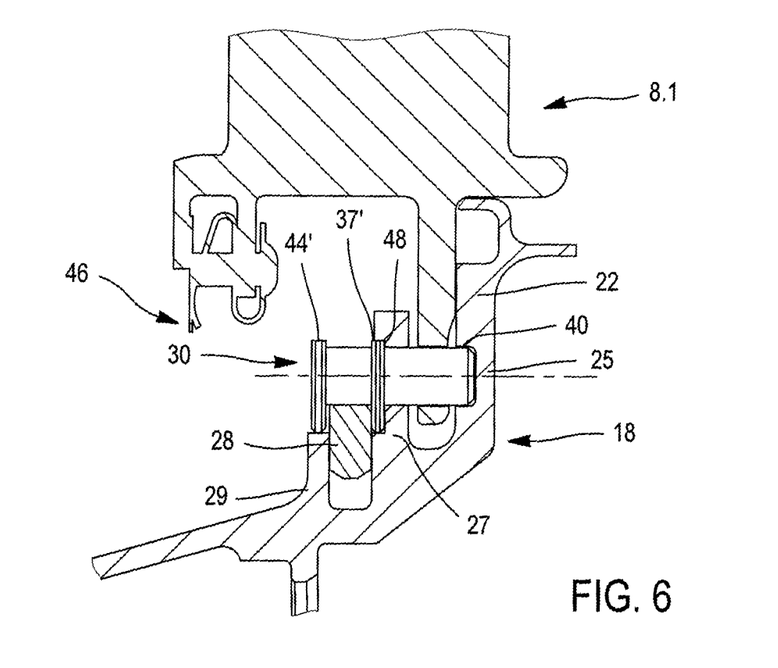
FIG. 6 is a longitudinal cross-sectional view of an alternative of FIG. 5.

FIG. 6 shows an alternative of the second embodiment, in which the guide vane assembly comprises sealing strips 46 bearing on the casing of the combustion chamber 2. When the angular sectors 8.1 of the guide vane assembly are in place, the sealing strips 46 are positioned axially upstream of the bores 36 of the second rib 27 and bother the placement of the pins 30. Indeed, their radially inner ends interfere with the periphery of the radial retaining pins 30 intended to be positioned radially outwardly, during insertion of the pins.

To that end, it is provided to make flat sections 37' and 44' on the first 37 and second 44 skirts of the radial retaining pins 30, these flat sections 37', 44' being oriented radially outwardly and allowing the insertion of the pins without coming into contact with the strips 46.

It is also provided to immobilize the pins in rotation to prevent the flat sections 37', 44' from being oriented radially inwardly, the skirts 37 and 44 then no longer defining a groove to receive the radially outer edge of the ring 28.

The angular immobilization of the pins 30 is obtained by forming a flat section 48 in a housing bordering the upstream end of the bores 36 radially outwardly, this flat section 48 having a shape corresponding to that of the flat section 37' of the skirt 37. The cooperation of the two flat sections 37', 48 then prevents the rotation of the pins 30.

Figure 7:
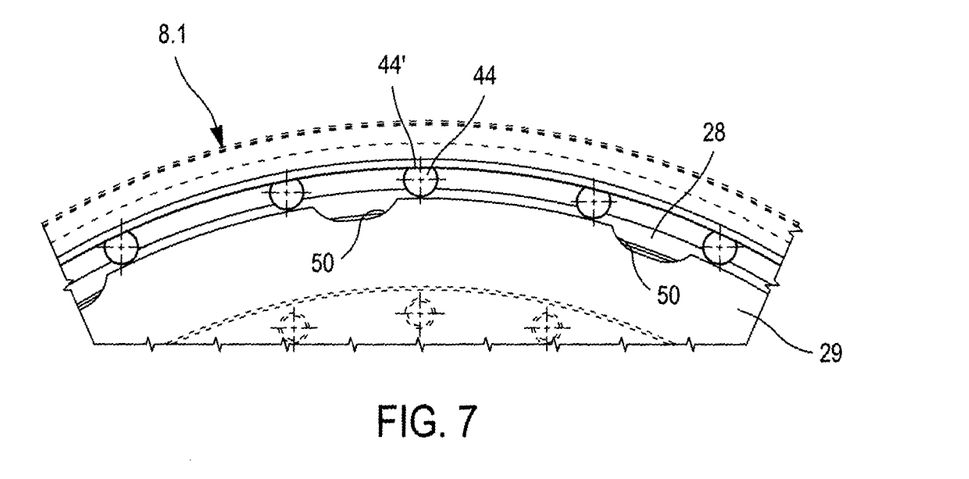
FIG. 7 is a front view on the combustion chamber side of the connection between the casing and the angular sectors according to the alternative of FIG. 6.

FIG. 7 shows a view of the upstream face of the high-pressure guide vane assembly 8 and the inner casing 18 with the radial retaining pins 30 provided with flat sections 44'.

In this embodiment, the third rib 29 comprises recesses 50 situated angularly between two bores 36, these recesses making it possible to reduce the mass of the inner casing, and therefore of the turbine engine.

The present invention is applicable to all fixed vane assemblies for turbine engines, and more particularly for the assembly of turbine guide vane assemblies.

The invention claimed is:

1. A stationary vane assembly of a turbine engine with a longitudinal axis, comprising:
   an inner casing;
   at least two angular sectors comprising blades forming a high-pressure turbine guide vane assembly, the angular sectors being fixed on the casing, each angular sector comprising a platform whereof at least one blade protrudes radially outwardly and a fastening tab for fastening the angular sector on the casing, the fastening tab protruding from the platform radially inwardly, the inner casing comprising a first annular groove with a longitudinal axis receiving the fastening tabs, and a second angular groove with a longitudinal axis receiving an axial retaining ring of radial retaining pins, the axial retaining ring being positioned on the combustion chamber side relative to the first groove; and
   radial retaining pins for the angular sectors introduced into bores made in the casing and the fastening tabs, the bores having axes substantially parallel to the longitudinal axis.

2. The stationary vane assembly according to claim 1, wherein each pin comprises a first radial skirt axially delimiting, on a pin, a head and a tail, the tail passing through the bores of the casing and the fastening tab, the first skirt bearing by one face against an annular rib separating the first and second grooves, and by another face against the axial retaining ring, the axial retaining ring bearing by a radially outer edge against a portion of the periphery of the head of each radial retaining pin, oriented radially inwards.

3. The stationary vane assembly according to claim 2, wherein the radial retaining pins comprise a second radial skirt at one free end of the head, the second skirt defining, with the first skirt, a space with a width substantially equal to that of the second annular groove, and receiving a portion of the radially outer edge of the ring.

4. The stationary vane assembly according to claim 3, wherein the first and second skirts of the radial retaining pins each comprise a flat portion, and a device for angular immobilization of the radial retaining pins.

5. The stationary vane assembly according to claim 4, wherein the angular immobilization device is formed by a housing comprising a flat section with a shape corresponding to that of the first skirt bordering the bore of the annular separating rib such that the flat sections of the skirts are oriented radially outwards.

6. The stationary vane assembly according to claim 1, wherein the axial retaining ring is slotted, and comprises two ends overlapping so that an axial stop edge forms a closed loop.

7. The stationary vane assembly according to claim 6, wherein the ends of the axial retaining ring are thinner and are connected by a portion with a larger thickness, the ends overlapping, each of the ends comprises at least one piercing for insertion of a tool to bring the ends closer together or further apart.

8. The stationary vane assembly according to claim 2, wherein a face of the first groove opposite the separating rib comprises non-through bores each receiving the free end of the tail of a radial retaining pin.

9. The stationary vane assembly according to claim 1, wherein each pin comprises a first radial skirt axially delimiting, on a pin, a head and a tail, the tail passing through the bores of the casing and the fastening tab, the first skirt bearing by one face against an annular rib separating the first and second grooves, and by another face against the axial retaining ring, the axial retaining ring bearing by a radially outer edge against a portion of the periphery of the head of each radial retaining pin, oriented radially inwards, and wherein the face of the first groove opposite the separating rib comprises through bores each receiving the free end of the tail of a radial retaining pin.

10. The stationary vane assembly according to claim 1, wherein each pin comprises a first radial skirt axially delimiting, on a pin, a head and a tail, the tail passing through the bores of the casing and the fastening tab, the first skirt bearing by one face against an annular rib separating the first and second grooves, and by another face against the axial retaining ring, the axial retaining ring bearing by a radially outer edge against a portion of the periphery of the head of each radial retaining pin, oriented radially inwards, and wherein the free ends of the tails of the radial retaining pins bear against the face of the first groove opposite the separating rib.

11. The stationary vane assembly according to claim 1, wherein the fastening tabs of the angular sectors each comprise first and second bores positioned on an arc of circle centered on the longitudinal axis, the first bore having a circular section and the second bore having an oblong section whereof the larger dimension is substantially aligned with the arc of circle.

12. A turbine engine comprising at least one stationary vane assembly according to claim 1.

* * * * *